2 Sheets—Sheet 1.
L. DEFENBAUGH.
Bee Hive.
No. 51,566.  Patented Dec. 19, 1865.
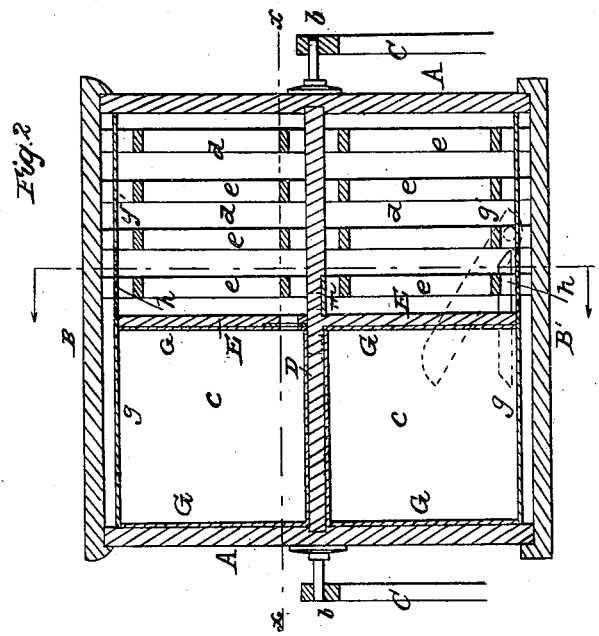
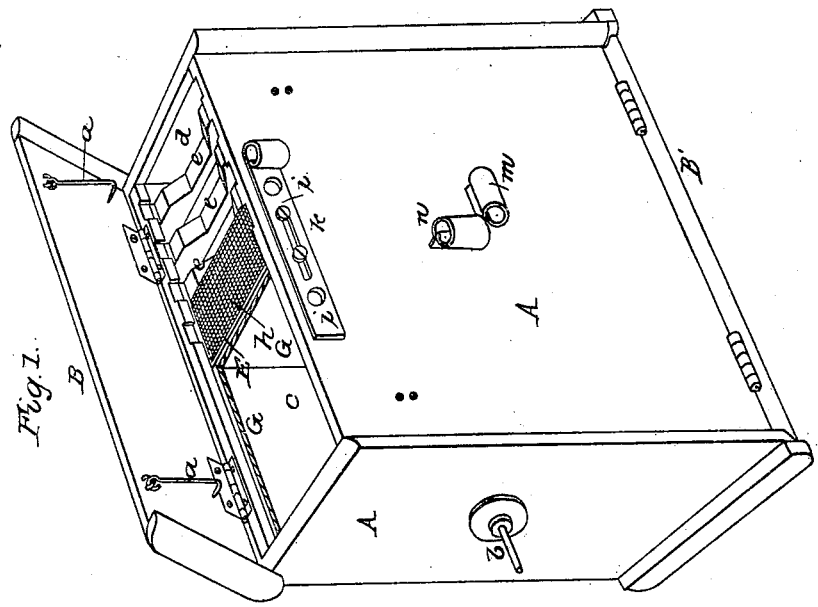
Witnesses
Inventor
Lewis Defenbaugh L. DEFENBAUGH.
Bee Hive.
No. 51,566.
2 Sheets—Sheet 2.
Patented Dec. 19, 1865.
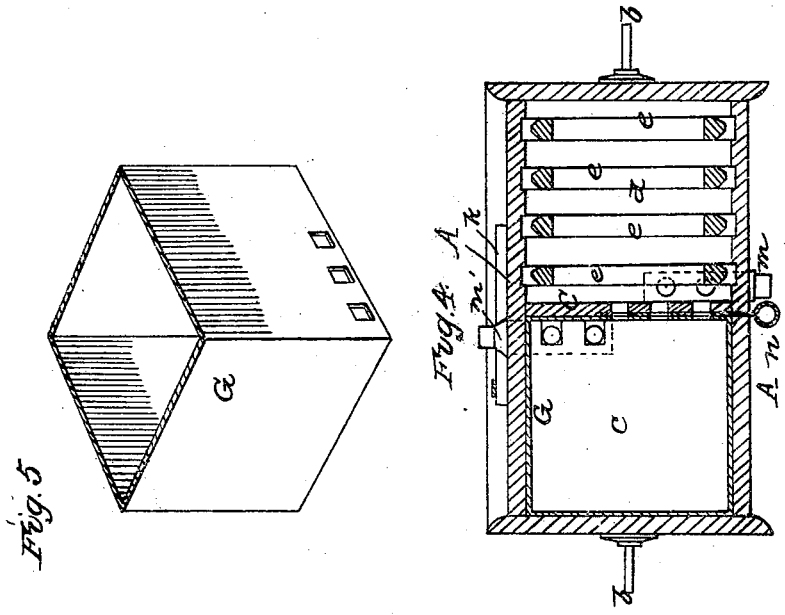
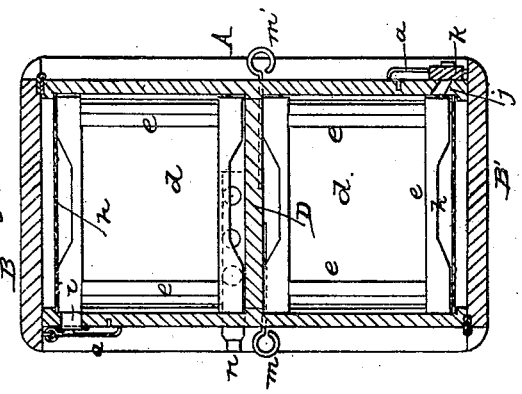
Witnesses
Inventor

UNITED STATES PATENT OFFICE.

LEWIS DEFENBAUGH, OF KOKOMO, INDIANA.

IMPROVEMENT IN BEE-HIVES.

Specification forming part of Letters Patent No. 51,566, dated December 19, 1865.

*To all whom it may concern:*

Be it known that I, LEWIS DEFENBAUGH, of Kokomo, in the county of Howard and State of Indiana, have invented a new and Improved Bee-Hive; and I do hereby declare that the following is a full, clear, and exact description thereof, reference being had to the accompanying drawings, making a part of this specification, in which—

Figure 1 is a perspective view of my improved hive with one of the doors elevated to show the interior of the hive. Fig. 2 is a vertical section through the hive. Fig. 3 is a transverse vertical section taken at the point indicated by the dotted line, Fig. 2. Fig. 4 is a section through the hive, taken in a horizontal plane, indicated by dotted line $x\ x$, Fig. 2. Fig. 5 is a perspective view of a removable box for facilitating the removal of honey-comb from the hive.

Similar letters of reference indicate corresponding parts in the several figures.

This invention consists in so constructing a bee-hive and mounting it upon pivot-bearings that the hive can be turned over at pleasure and the bees made to leave one apartment and enter another, for the purpose of removing the honey-comb, as will be hereinafter described.

It also consists in providing a reversible hive with doors on its upper and lower ends, for the purpose of obtaining access to the upper and the lower apartments of the hive, and also to provide for a free ventilation of the hive from below, as will be hereinafter described.

It also consists in providing the chambers of the hive with removable boxes or linings, within which the bees form the choice honey, for the purpose of facilitating the removal of the comb from the said chambers, as will be hereinafter described.

To enable others skilled in the art to understand my invention, I will describe its construction and operation.

In the accompanying drawings, A represents a rectangular box, which may be made of any suitable capacity, and which has its top and bottom ends closed by means of hinged covers B B', that are provided with hook-fastenings $a\ a$, for keeping the covers closed and for supporting the bottom cover in a slightly open condition for admitting of the entrance of the miller, which will lay its eggs upon the upper surface of this cover, and here remain without passing up into the hive among the bees.

By loosening the hooked fastenings $a\ a$ the cover may be opened and the eggs swept off, and thus destroyed.

In the center of each vertical end of the box A are pivots $b\ b$, which are suitably secured to these ends for the purpose of supporting the box A upon standards C C. (Shown in Fig. 2.) By this arrangement it will be seen that the box A can be very readily inverted without disturbing the bees which may be in it.

The box A is subdivided by a horizontal central partition, D, and two vertical partitions, E E, one above and the other below the horizontal partition, which latter partitions E may be made to slide in and out of the box A, for the purpose of enlarging the apartments and giving the bees plenty of room during the winter season, and dividing these apartments into two chambers, $c\ d$, above and below the horizontal partition D, during the working season.

The apartments $d\ d$ are provided with sliding frames $e\ e\ e$, which may be constructed in any suitable manner, for the bees to make their combs upon, and the apartments $c\ c$, in which the choice honey is made, are each provided with a thin case or lining, G, (shown clearly in Figs. 1, 2, and 4 in their proper places in the chambers $c\ c$, and in Fig 5 detached from the hive.) These cases are made of pasteboard or other suitable substance, and they have neither bottom nor top. They are cut so as to fit snugly within their respective chambers, and so that they can be easily removed full of honey-comb.

When the cases G are introduced into their chambers the partition D will close one end of each case, and glass slides $g\ g$ are used for covering the other ends of these cases, as shown in Fig. 2, so that when one or the other of the covers B B' is opened the bees will not escape. The chambers $d\ d$ are closed at one point by said partition and at their outer ends by glass slides $g'\ g'$ and wire-cloth plates $h\ h$, which latter will admit of a free circulation of air through the hive, and also prevent the bees from escaping.

The entrances for the bees into the hive are at $i\ i$ and $j\ j$, which entrances are closed, when desired, by means of slides K K. The two slides $m\ m'$ are used for closing the bee-passages which form communications between the apartments *c c* and the apartments *d d*. The slide *n* is used for closing all communication between the apartments *c* and *d*.

From the above description it will be seen that I combine two hives or hive-chambers in one box in such manner that the bees can pass from one chamber into another, make their honey, and form their winter store. When it is desired to remove the honey from the hive the bees are driven from one chamber into another by means of the slides which are used for closing their entrance-openings, and the hive can be turned upside down for the purpose of getting at the honey-comb in the lower apartments.

By the arrangement of the passages for the bees to pass from one apartment to another, (shown in the drawings,) and the sliding closers which are applied to these passages, the bees can be driven out and shut off from any part of the hive at pleasure. I thus have a storehouse for a large or a small sized swarm of bees.

Having thus described my invention, what I claim as new, and desire to secure by Letters Patent, is—

1. A reversible bee-hive which consists of four apartments, *c c d d*, communicating with each other, and provided with sliding closers for shutting off the communications, substantially as described.

2. Sustaining the bee-hive, which is constructed substantially as described, upon pivot-bearings in such manner that it can be turned over at pleasure without disturbing the bees.

3. The combination of the chambers *c c d d* with the two covers B B' and a hive-box which moves about a central axis, substantially as described.

4. Providing the chambers *c c* with removable cases, G, substantially as described.

LEWIS DEFENBAUGH.

Witnesses:
   JOHN W. COOPER,
   WILSON T. COOPER.